United States Patent [19]

Kato

[11] Patent Number: 5,738,181
[45] Date of Patent: Apr. 14, 1998

[54] PRESS FIT ARRANGEMENT OF A NUT MEMBER IN AN ENLARGED END PORTION OF A HOLLOW SHAFT

[75] Inventor: Jun-ichi Kato, Gunma-ken, Japan

[73] Assignee: Mitsuba Electric Mfg. Co., Ltd., Gunma-Ken, Japan

[21] Appl. No.: 546,161

[22] Filed: Oct. 20, 1995

[30] Foreign Application Priority Data

Nov. 9, 1994 [JP] Japan ................... 6-299059

[51] Int. Cl.$^6$ ............................... B62D 5/04
[52] U.S. Cl. ................... 180/400; 180/444; 74/459; 74/499
[58] Field of Search ................... 180/443, 444, 180/400; 411/432, 361, 265, 267; 74/459, 499, 89.15, 424.8 R

[56] References Cited

U.S. PATENT DOCUMENTS 5,562,017 10/1996 Wuenscher ............... 91/375 A
5,590,732 1/1997 Sugino et al. .............. 180/444

Primary Examiner—Kevin Hurley
Attorney, Agent, or Firm—Skjerven Morrill MacPherson Franklin & Friel; Thomas S. MacDonald

[57] ABSTRACT

In a press fit arrangement of a tubular nut member in an enlarged end portion of a hollow shaft, typically used in an electric power steering device, a region of loose fit is provided in a part of an interface between the tubular nut member and the enlarged portion, adjacent to an annular shoulder defined at the inner boundary of the enlarged portion. The region of loose fit can be achieved by provided an annular recess in the inner bore of the enlarged portion and/or the outer circumferential surface of the nut member. Thereby, the region of a relatively high rigidity, which is created by the provision of the annular shoulder, is prevented from being involved in the press fit when the nut member is fitted into the inner bore of the enlarged portion until the inner end of the nut member abuts the annular shoulder so that a relatively uniform tight fit can be achieved between the nut member and the enlarged portion over a relatively large axial length. Thus, a desired tight fit can be achieved without requiring any undue press fitting pressure or without causing any undue deformation to the nut member.

8 Claims, 3 Drawing Sheets prior art

PRESS FIT ARRANGEMENT OF A NUT MEMBER IN AN ENLARGED END PORTION OF A HOLLOW SHAFT

TECHNICAL FIELD

The present invention relates to a press fit arrangement of a tubular nut member in an enlarged end portion of a hollow shaft, and in particular to a press fit arrangement suitable for use in a mechanism for converting rotational movement of a hollow shaft into an axial movement of a screw rod coaxially received in the hollow shaft via a tubular nut member press fitted into the hollow shaft and threadably meshing with the screw rod. This arrangement is particularly useful for electric power steering devices.

BACKGROUND OF THE INVENTION

Conventionally, a compactly designed electric power steering device typically comprises a hollow shaft carrying a motor armature thereon, a drive shaft including a screw rod coaxially received in the hollow shaft, and a ball screw mechanism interposed between the hollow shaft and the screw rod, whereby the torque produced by the motor armature is converted into the axial force of the screw rod, and, hence, the drive shaft. The drive shaft is connected to the front wheels via tie rods so that the torque produced by the motor armature actuates the front wheels.

FIG. 4 shows a conventional arrangement for an electric power steering device. The drive shaft 1 is provided with a ball screw thread 1a, and a tubular nut member 6 which meshes with the ball screw thread 1a via balls 6 is press fitted into an enlarged end portion 4 of a hollow shaft 2. The inner end of the nut member 6 abuts an annular shoulder 4a defining the inner boundary of the enlarged portion 4 to thereby axially locate the nut member 6, and the open outer end of the hollow shaft 2 is crimped inwardly onto the outer end surface of the nut member 6.

In such an arrangement, the annular shoulder 4a creates a region of high rigidity, and the enlarged portion is hence provided with a progressively higher rigidity against radial deformation with the increase in the distance from the outer end, or from part A to part C. Therefore, when the nut member 6 is press fitted into the inner bore of the enlarged portion 4, part C provides a highly tight fit as compared to parts A and B. Therefore, parts A and B make relatively small contributions to the tight fit between the nut member 6 and the enlarged portion 4. In other words, when a desired tight fit is achieved between the nut member 6 and the enlarged portion 4, a substantially large inward stress is applied to the nut member 6 at part C which may impair a satisfactory operation of the ball screw mechanism. This is very significant because a slightest radial deformation of the nut member 6 could cause a substantial increase in the friction of the ball screw mechanism. Conversely, when the pressure involved in the tight fit between the nut member 6 and the enlarged portion 4 is reduced so as not to cause any excessive deformation to the nut member 6, a desired tight fit may not be achieved, and a relative movement between the nut member 6 and the hollow shaft 2 could occur. This last situation is obviously impermissible for satisfactory operation of the electric power steering device.

BRIEF SUMMARY OF THE INVENTION

In view of such problems of the prior art, a primary object of the present invention is to provide a press fit arrangement of a tubular nut member in an enlarged end portion of a hollow shaft which can allow a desired tight fit to be achieved therebetween without causing any undue deformation of the nut member.

A second object of the present invention is to provide a press fit arrangement of a tubular nut member in an enlarged end portion of a hollow shaft which can allow a desired tight fit to be achieved therebetween without requiring any undue pressure for press fit.

A third object of the present invention is to provide a press fit arrangement of a tubular nut member in an enlarged end portion of a hollow shaft which is economical and easy to assemble.

A fourth object of the present invention is to provide a press fit arrangement of a tubular nut member in an enlarged end portion of a hollow shaft which is suitable to be implemented in electric power steering devices for mass production.

These and other objects of the present invention can be achieved by providing a press fit arrangement of a tubular nut member in an end portion of a hollow shaft, which typically consists of an enlarged portion of said hollow shaft, an annular shoulder being defined at an inner end of the end portion, and the tubular nut member threadably meshing with a drive shaft which is coaxially received in the tubular nut and the hollow shaft, and provided with a corresponding screw thread, wherein: a region of loose fit is provided in a part of an interface between the tubular nut member and the end portion, adjacent to the annular shoulder.

Thus, the region of loose fit, which may be achieved by provided an annular recess in the inner bore of the end portion, which is typically provided with a larger diameter than the adjacent region of the hollow shaft, and/or the outer circumferential surface of the nut member, prevents the region of a relatively high rigidity, which is created by the provision of the annular shoulder, from being involved in the press fit when the nut member is fitted into the inner bore of the end portion until the inner end of the nut member abuts the annular shoulder defining the inner boundary of the end portion so that a relatively uniform tight fit can be achieved between the nut member and the end portion over a relatively large axial length. Thereby, a desired tight fit can be achieved without requiring any undue pressure or without causing any undue deformation to the nut member.

The annular recess may be provided either with a substantially uniform diameter, or with a tapered profile.

The present invention is particularly suitable for use in an electric power steering device in which the hollow shaft is fitted with a motor armature, and the drive shaft is connected to tie rods for steering road wheels.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
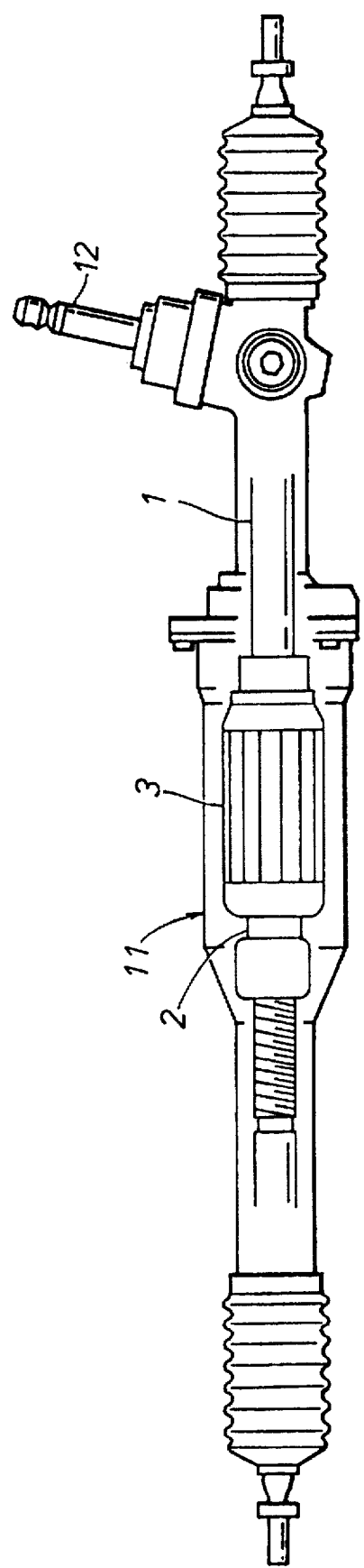
FIG. 1 is a front view of an electric power steering device to which the present invention is applied.

FIG. 1 shows an electric power steering device to which the present invention is applied. In FIG. 1, a drive shaft 1 is coaxially and axially slidably received in a tubular casing extending laterally across a vehicle body which is not shown in the drawing, and is connected to right and left front wheels, via tie rods, at axial ends thereof. An intermediate part of the drive shaft 1 is provided with a rack (not shown in the drawing), and a pinion attached to a pinion shaft 12 meshes with this rack.

A hollow motor shaft 2 is coaxially fitted on the drive shaft 1, and a motor armature 3 is fixedly and coaxially secured on the outer circumferential surface of the hollow motor shaft 2 so as to rotate integrally with the hollow shaft 2. The drive shaft 1 and the hollow motor shaft 2 are engaged with each other by a ball screw mechanism which converts the rotational movement of the hollow motor shaft 2 into the axial movement of the drive shaft 1. Thus, the rotative torque produced by the motor armature 3 is converted into the axial force of the drive shaft 1 which in turn steers the front wheels, to assist the manual steering effort applied to a steering wheel (not shown in the drawing) connected to the pinion shaft 12.

Figure 2:
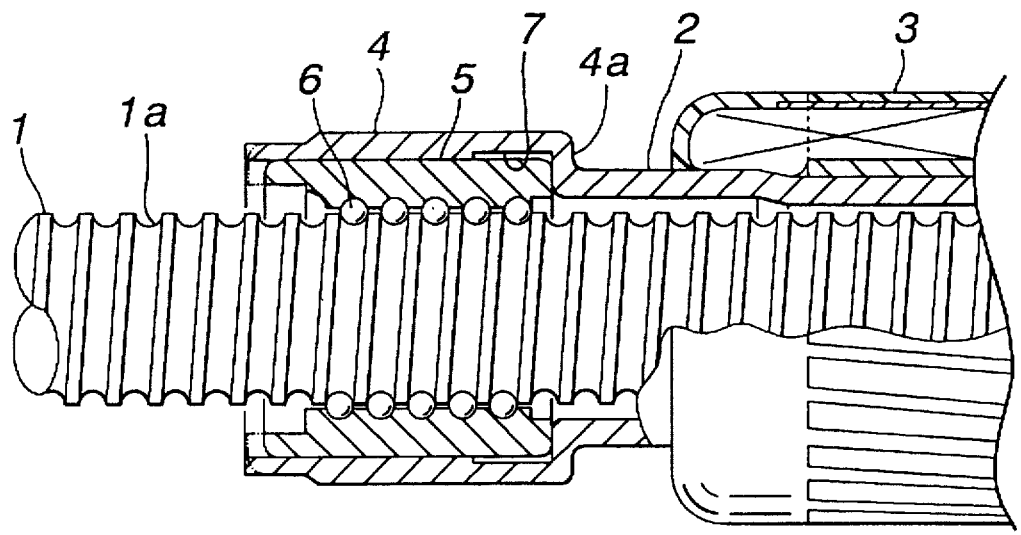
FIG. 2 is a fragmentary sectional view of a first embodiment of the press fit arrangement used in the electric power steering device of FIG. 1 according to the present invention.

FIG. 2 shows an essential part of the ball screw mechanism. An axial end of the hollow shaft 2 is provided with an enlarged portion 4, which is internally fitted with a nut member 5. The nut member 5 is provided with an internal screw thread which meshes with a corresponding external screw thread 1a provided in the drive shaft 1 via balls 6 for reducing friction, and is press fitted into the internal bore of the enlarged portion 4. The inner end of the nut member 5 abuts an annular shoulder 4a which defines the inner boundary of the enlarged portion 4, and the outer end of the hollow shaft 4 is crimped onto the outer end of the nut member 5 to retain the nut member 5 in the enlarged portion 4.

The inner circumferential surface of the part of the enlarged portion 4 adjacent to the shoulder 4a is provided with an annular recess 7. In other words, the part of the inner bore of the enlarged portion 4, extending from an axially intermediate part thereof to the annular shoulder 4a, is provided with a somewhat larger inner diameter than the remaining part of the inner bore. Thus, the annular recess 7 surrounds the free end portion of the nut member 5 which is press fitted into the inner bore of the enlarged portion 4a until the free end thereof abuts the annular shoulder 4a, and thereby defines a region of loose fit.

Figure 4:
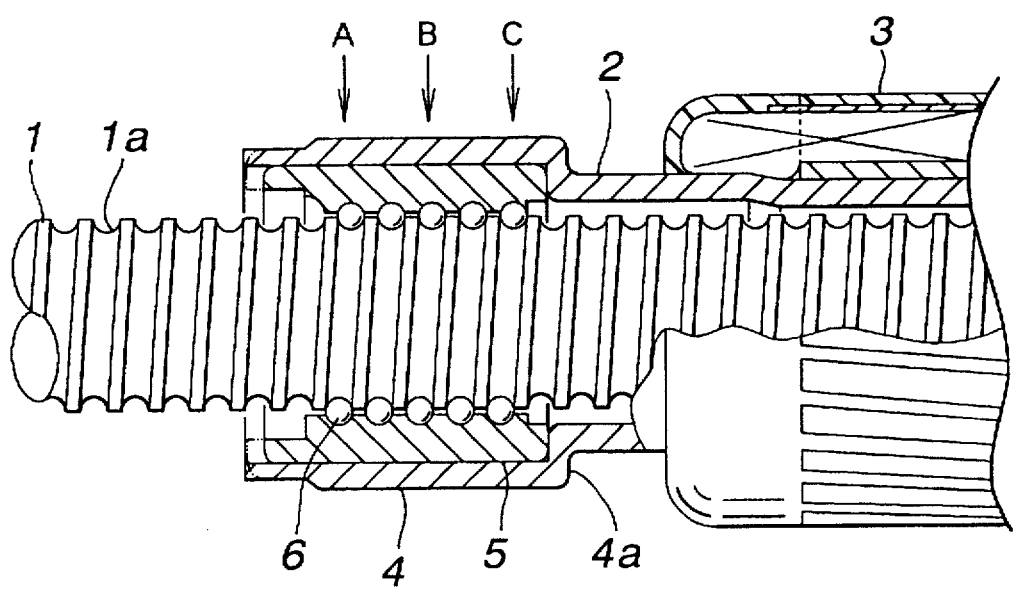
FIG. 4 is a view similar to FIG. 1 showing a conventional press fit arrangement.

This annular recess 7 is advantageous for the following reason. Suppose that there is no annular recess as illustrated in FIG. 4. When the nut member 5 is press fitted into the inner bore of the enlarged portion 4 until the free end thereof abuts the annular shoulder 4a, the different parts A, B and C of the enlarged portion 4 present different rigidities with respect to the deformation of the enlarged portion 4 resulting from the press fitting of the nut member 5. Typically, the rigidity progressively increases with the distance from the open end of the enlarged portion 4 or with the proximity to the annular shoulder 4a. Therefore, a significant force is necessary to fully press fit the nut member 5 into the inner bore because the part C is significantly more rigid than part A or part B. As a result, an extremely tight fit may be achieved by part C, but parts A and B may be made ineffective in retaining the nut member 5 in the inner bore. Furthermore, the rigidity of part A may be so high that the nut member 5 may be deformed in radially inward direction. This is undesirable as it may impair the satisfactory operation of the ball screw mechanism.

By provision of the annular recess 7, the nut member 5 is press fitted into the inner bore of the enlarged portion 4 over parts A and B (region of tight fit) while there is no contact between the nut member 5 and the enlarged portion 4 at the part C (region of loose fit). Thereby, a relatively tight fit can be achieved between the nut member 5 and the enlarged portion 4 over a relatively large length of the nut member 5. Thus, a favorable tight and secure fit can be achieved between the nut member 5 and the enlarged portion 4 without causing any undue deformation to the nut member 5. Additionally, no substantial axial force is required for press fitting the nut member 5 into the inner bore of the enlarged portion 4.

Figure 3:
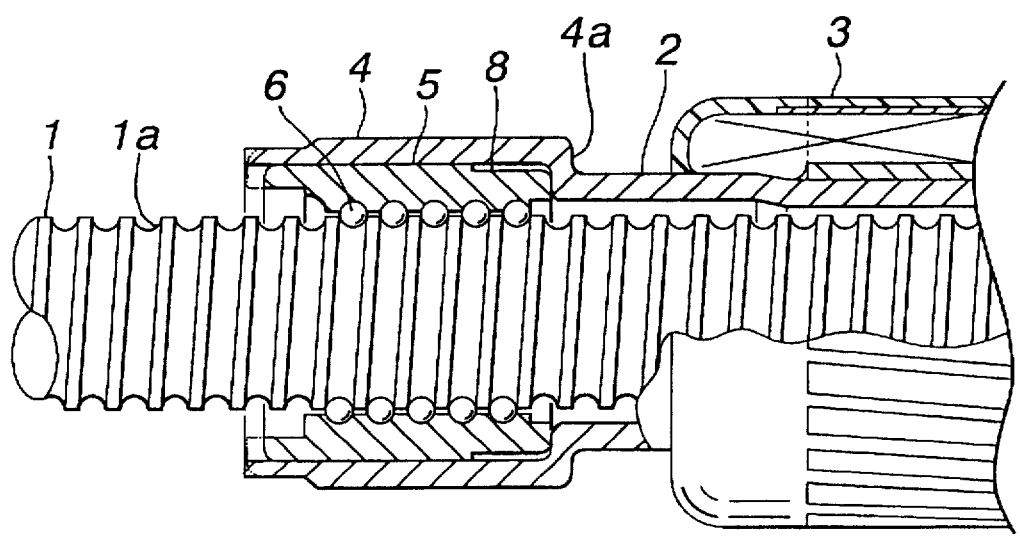
FIG. 3 is a view similar to FIG. 1 showing a second embodiment of the present invention.

FIG. 3 shows a second embodiment of the present invention, and the parts corresponding to those of the first embodiment are denoted with like numerals. In this embodiment, an annular recess 8 is provided around the inner end portion of the nut member 5. In other words, the annular recess 8, consisting of a reduced diameter portion, extends from an axially intermediate part of the nut member 5 to the axially inner end thereof. This embodiment may be easier and less expensive to implement as it is substantially easier to form the annular recess 8 in outer circumferential surface of the nut member 5 than the annular recess 7 in the inner circumferential surface of the enlarged portion 4, and the annular recess 8 may additionally provide a guiding action when fitting the nut member 5 into the inner bore of the enlarged portion 4. This embodiment is otherwise identical to the first embodiment, and can provide similar advantages.

It is also possible to form the annular recess 8 as a tapered portion defined by a conical section, having a suitable cone angle, extending over an inner end portion of the nut member 5. According to this modified embodiment, in addition to the above mentioned advantages, an even more favorable guiding action can be provided by the conical profile thereof when fitting the nut member 5 into the inner bore of the enlarged portion 4.

Thus, according to the present invention, when press fitting a tubular nut member into an enlarged end portion of a hollow shaft, by providing a region of loose fit adjacent to the annular shoulder defining the inner boundary of the enlarged portion, it is possible to achieve a relatively uniform tight fit over a substantial axial length. Therefore, a secure and reliable fit can be achieved without requiring any undue press fitting pressure or without involving any undue deformation of the nut member.

Although the present invention has been described in terms of preferred embodiments thereof, it is obvious to a person skilled in the art that various alterations and modifications are possible without departing from the scope of the present invention which is set forth in the appended claims.

What we claim is:

1. In a press fit arrangement of a tubular nut member in an end portion of a hollow shaft, an annular shoulder being defined at an inner end of said end portion, and said tubular nut member threadably meshing with a drive shaft which is coaxially received in said tubular nut and said hollow shaft, and provided with a corresponding screw thread, wherein:

a region of loose fit is provided in a part of an interface between said tubular nut member and said end portion, adjacent to said annular shoulder.

2. In a press fit arrangement according to claim 1, wherein said region of loose fit is created by an annular recess provided in a part of an inner bore of said end portion adjacent to said annular shoulder.

3. In a press fit arrangement according to claim 1, wherein said region of loose fit is created by an annular recess provided in a part of an outer circumferential surface of said nut member adjacent to said annular shoulder.

4. In a press fit arrangement according to claim 3, wherein said annular recess is provided with a substantially uniform outer diameter.

5. In a press fit arrangement according to claim 3, wherein said annular recess is provided with a tapered profile.

6. In a press fit arrangement according to claim 1, wherein said end portion of said hollow shaft comprising of an enlarged portion of said hollow shaft.

7. In a press fit arrangement according to claim 6, wherein an inner axial end of said nut member abuts said annular shoulder defining the inner boundary of said enlarged end portion.

8. In a press fit arrangement according to claim 1, wherein said hollow shaft is fitted with a motor armature of an electric power steering device, and said drive shaft is connected to an output end of said power steering device.

* * * * *